United States Patent
Soto et al.

(10) Patent No.: US 8,374,508 B2
(45) Date of Patent: Feb. 12, 2013

(54) AUGMENTING PASSIVE OPTICAL NETWORKS

(76) Inventors: Alexander I Soto, San Diego, CA (US); Walter G Soto, San Diego, CA (US)

( * ) Notice: Subject to any disclaimer, the term of this patent is extended or adjusted under 35 U.S.C. 154(b) by 505 days.

(21) Appl. No.: 12/646,978

(22) Filed: Dec. 24, 2009

(65) Prior Publication Data

US 2010/0150566 A1    Jun. 17, 2010

Related U.S. Application Data

(63) Continuation-in-part of application No. 10/867,107, filed on Jun. 14, 2004, now abandoned.

(60) Provisional application No. 60/477,860, filed on Jun. 12, 2003.

(51) Int. Cl.
   *H04B 10/00*    (2006.01)
(52) U.S. Cl. ......... 398/115; 398/116; 398/130; 398/138
(58) Field of Classification Search .................. 398/140, 398/141, 115, 116, 128, 130, 135, 138
   See application file for complete search history.

(56) References Cited

U.S. PATENT DOCUMENTS

| | | | |
|---|---|---|---|
| 6,111,678 A | | 8/2000 | Mathoorasing et al. |
| 6,504,636 B1 * | | 1/2003 | Seto et al. ......... 398/91 |
| 6,738,584 B1 * | | 5/2004 | Tsuda et al. ......... 398/147 |
| 2002/0012495 A1 | | 1/2002 | Sasai et al. |
| 2002/0061163 A1 | | 5/2002 | Bartur et al. |
| 2003/0002100 A1 * | | 1/2003 | Izadpanah ......... 359/124 |
| 2003/0035183 A1 | | 2/2003 | Seto et al. |

OTHER PUBLICATIONS

"Anacom Design Guide," Anacom Systems Corporation, Sep. 2003.
Gerhard Franz, "RF Over Fiber," A.G. Franz Associates LLC, Jun. 6, 2003.
Henry Wojtunik, Wireless Networks Over Fiber, Fiber-Span LLC, 2003.
Kang Hyo-Soon et al., "Introduction to Microwave Photonics," Yonsei University Int'l Topical Meeting 1999, 2000.
"Fiber-Span Design Guide," Fiber-Span LLC, Undated (NLT Feb. 15, 2005).

* cited by examiner

*Primary Examiner* — M. R. Sedighian

(57) ABSTRACT

Passive optical networks have optical budget loss limitations that affect the ability of a Service Provider to serve a limited number of clients over a limited range. The deployment of passive optical networks is constrained by potential physical rights of way issues. A method and system for augmenting communication links of a passive optical network are disclosed which utilize radio frequency communication enabling an increase in the number of clients on the network as well as increasing the reach or range of the network while potentially eliminating physical rights of way issues.

19 Claims, 9 Drawing Sheets

AUGMENTING PASSIVE OPTICAL NETWORKS

CROSS-REFERENCE TO RELATED APPLICATIONS

This application is filed under 37 C.F.R. §1.53(b)(2) as a continuation-in-part claiming the benefit under 35 U.S.C. §120 of the U.S. patent application Ser. No. 10/867,107, "Converting Signals In Passive Optical Networks," which was filed by the same inventors on Jun. 14, 2004 claiming the benefit under 35 U.S.C. 119(e) of U.S. Provisional Application No. 60/477,860 filed Jun. 12, 2003, now expired, and entirely incorporated herein by reference.

FIELD OF THE INVENTION

The invention relates to optical communications networks, and specifically to passive optical networks.

BACKGROUND OF THE INVENTION

Incumbent Local Exchange Carriers (ILECs), Competitive Local Exchange Carriers (CLECs) and other Service Providers strive to deploy the most cost effective networks possible that provide broadband service links. Cost effectiveness is a relative term often measured by comparing the cost of equipment and material (also known as Capital Expenses CAPEX), the cost of service maintenance and operations (also known as Operational Expenses OPEX) and the cost of missed revenue generating opportunity due to deployment delays of alternative and competing network solutions. These cost comparisons are typically complex and difficult to obtain due to the nature of the broadband service links between a network's core and a building or a premise. One problem for Service Providers of broadband service links stems from requirements to connect different types of communication equipment using multiple protocol conversions and communication link conversions. Typically, conversions are a large source of expense for ILECs, CLECs and other Service Providers.

For example, a broadband service link between a network's core and a building or premise may consist of three communication segments (fiber-wireless-fiber) each with multiple protocol and communication link conversions. At the network core, a SONET/SDH fiber may be connected to ATM communication equipment that performs add-drop-mux (ADM) functions in accordance with a SONET/SDH protocol. Line cards within the ATM communication equipment aggregate, switch and convert traffic to other protocols such as Ethernet, which are used across fiber distribution links such as Gigabit Ethernet (GbE). The fiber distribution links are connected to other communication equipment that perform wireless base-station functions that may include yet another protocol conversion to support the broadband wireless access (BWA) protocol in-use. The broadband service link propagates over the air. A wireless terminal terminates the BWA protocol in-use and converts back to an Ethernet or SONET/SDH protocol. The wireless terminal distributes broadband services across fiber links to a network terminal equipment residing at a building or premise. In this example, the broadband service links undergoes multiple protocol conversions and communication link conversions between the network's core and a premise. Each protocol conversion increases a Service Provider's CAPEX and OPEX expense of a fiber network.

Additionally, Service Providers are encumbered with obtaining physical rights of way when deploying fiber. The fiber can be directly buried, placed in ducts or strung aerially along the right of way. Licenses for rights of way may need to be negotiated with several municipalities or local governments, and may require the purchase or lease of property. Deploying fiber around rivers, water ways, canyons, mountains and other physical obstacles adds to the complexity of securing right of ways. Rights of way issues increase the deployment cost, a Service Provider's CAPEX and OPEX, of a fiber network.

Furthermore, optical signal transmissions in optical fiber networks have limited optical power and thus have limited range. In passive optical networks, optical signals are split passively to increase the number of end terminals or clients. However, limited optical power budgets limit the number of clients and the reach of the network. There may be a trade-off between the number of clients on the network and the area of coverage of the network. For example, a Service Provider may need to choose between a network with twice as many clients but half the range of coverage and a network with half as many clients but with twice the range of coverage.

There is a need to extend or augment the number of clients, network area of coverage or circumvent physical rights of way obstacles when Service Providers deploy passive optical network fiber links in a manner that minimizes the number of protocol conversions.

SUMMARY OF THE INVENTION

The problem of increasing the number of clients, increasing network range or area of coverage, or circumventing the physical rights of way obstacles when deploying a passive optical network in a manner that minimizes the number of protocol conversions is solved by using optical-to-radio and radio-to-optical converters in fiber links of the passive optical network. The converter is able to perform optical-to-electrical or electrical-to-optical conversion of signals as well as appropriate mixing of signals for radio transmission and de-mixing of received radio signals.

In general, in one aspect, an embodiment of the invention includes a converter including an optical fiber input port; an optical detector configured to receive an optical signal over the optical fiber input port and generate a first electrical signal carrying information; and a mixer in electrical communication with the optical detector configured to mix the first electrical signal with a radio frequency carrier wave producing a second electrical signal for transmission by an antenna.

In general, in another aspect, an embodiment of the invention includes a converter including an antenna configured to receive a radio frequency signal; a mixer configured to down-convert a received radio frequency signal to a baseband electrical signal carrying information; and a laser driver in electrical communication with the mixer configured to modulate an optical signal with the baseband electrical signal producing a modulated optical signal for transmission over an optical fiber link.

In general, in another aspect, an embodiment of the invention includes a converter including an optical fiber input port; an optical detector configured to receive an optical signal over the optical fiber input port and generate a first electrical signal carrying information; a first mixer in electrical communication with the optical detector configured to mix the first electrical signal with a radio frequency carrier wave producing a second electrical signal for transmission by an antenna; an antenna configured to receive a radio frequency signal; a second mixer configured to down-convert a received radio frequency signal to a baseband electrical signal carrying information; and a laser driver in electrical communication with the second mixer configured to modulate an optical signal with the baseband electrical signal producing a modulated optical signal for transmission over an optical fiber link. The modulated optical signal carries the same information as the baseband electrical signal. The second electrical signal carries the same information as the first electrical signal.

Aspects of embodiments of the invention may include one or more of the following features. Converters may have filters before and after the mixer to improve performance of the mixer and possibly reshape signals. Means to adjust the optical power level or radio power level of transmissions from converters. A converter may include automatic gain control to improve communications. A converter may include a passive optical network protocol processor which include a media access controller or transmission convergence layer device that is capable of communication with an optical line terminal. The optical line terminal may regulate or adjust the optical power level, radio power level, filter parameters and radio frequency used by a converter. The optical line terminal may also receive information from a converter about received optical power level, received radio power level, filter parameters and radio frequency used by a converter. Converters may also convert a plurality of optical signals on different wavelengths to radio signals on different frequencies and vice versa. A converter may also combine two optical signals onto a single radio signal or separate a radio signal into two optical signals using quadrature modulation.

Embodiments of the invention may include one or more of the following advantages. PONs conventionally have a limit to the number of clients and a limit to the maximum distance (or reach) from an Optical Line Terminator (OLT) and a client Optical Network Unit (ONU) or Optical Network Terminal (ONT). This limit is primarily a function of optical power loss. An increase in the number of clients may lead to an increase in the number of splits in the fiber network and a decrease in the received optical power for the receivers of both OLT and client ONU/ONTs. Likewise, an increase in the maximum distance between an OLT and an ONU/ONT client may lead to a decrease in received optical power for the receivers of both OLT and ONU/ONT clients, the reduced optical power substantially reducing the number of clients the network is capable of supporting with a given optical power loss budget. Typically, a design trade off exists between number of clients and maximum reach. Augmenting an Optical Distribution Network (ODN) of a PON with wireless links influences the ease of deploying the PON and the associated design trade-offs in a positive manner.

DETAILED DESCRIPTION

Figure 1:
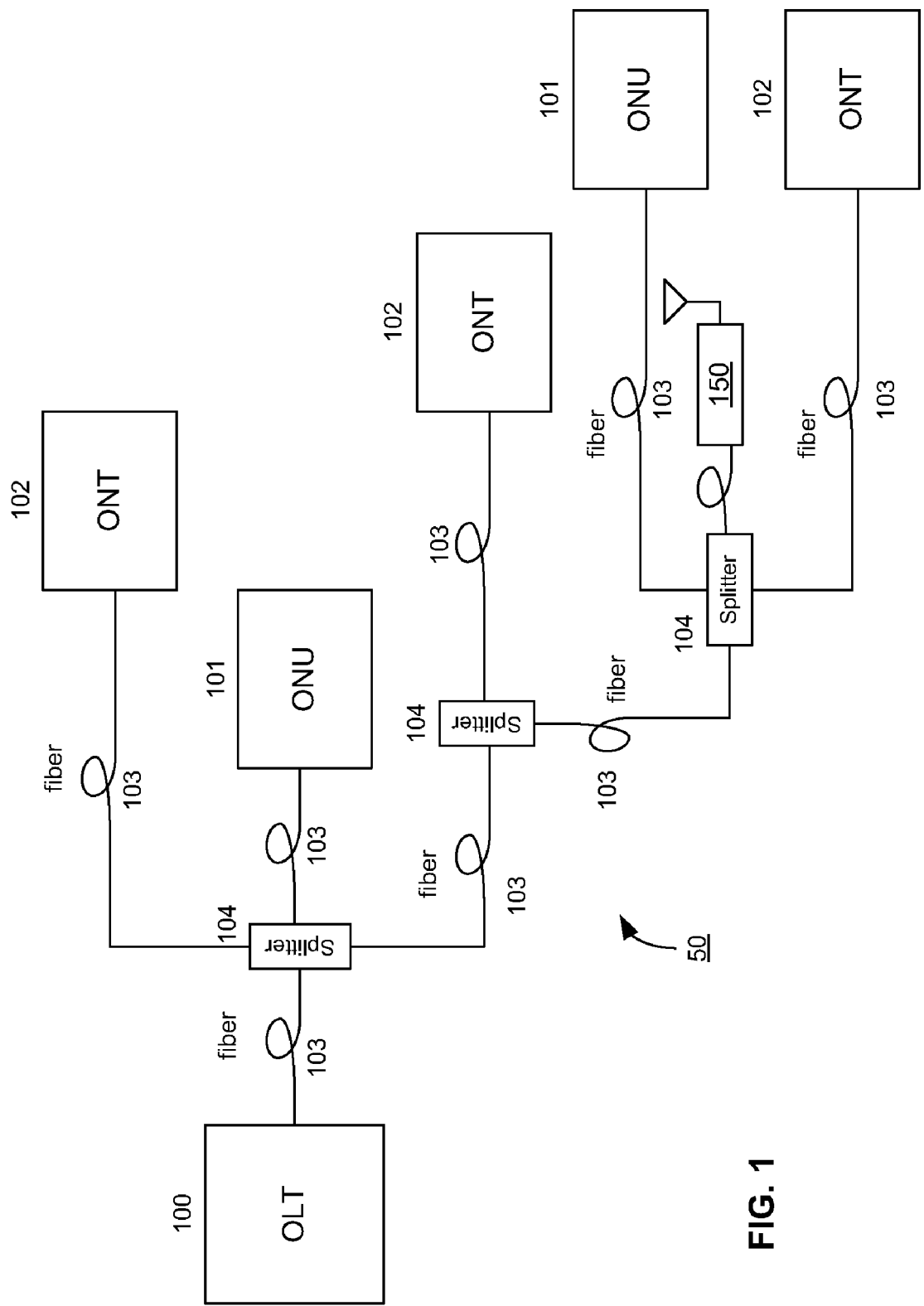
FIG. 1 is a block diagram of a passive optical network.

Passive Optical Network (PON) fiber links can be augmented to use radio frequency (RF) communication links. A PON can be configured in a point-to-multipoint fiber optic network in a tree-branch network architecture. FIG. 1, wherein like reference numerals designate identical or corresponding parts throughout the several views and embodiment, shows an example of a PON, where an Optical Line Terminator (OLT) 100 provides broadband communication to a plurality of client optical networking devices, including Optical Network Units (ONUs) 101 and Optical Network Terminals (ONTs) 102, at nodes in an Optical Distribution Network (ODN) 50. ODN 50 includes optical fibers 103, splitters 104, optical fiber splices (not shown) and optical fiber connectors (not shown) between an OLT 100 node and ONU 101 and ONT 102 nodes. The splitters 104 are unpowered optical splitters which generally utilize Brewster's angle principals. Any of a variety of PON embodiments may be used including embodiments according to the ITU G.983, G.984 and IEEE 802.3ah specifications, which are hereby incorporated by reference, or a derivative specification thereof.

In general, at an abstract high level description, the role of an OLT 100 is to control information traffic exchanged across the ODN 50 between the OLT 100 and client ONUs 101 and ONTs 102 while interfacing with network service entities (not shown) to provide broadband services across a PON. These network service entities provide subscribers with various forms of voice, data or video services. Each ONU 101 responds to the OLT's 100 control to exchange information between the OLT's 100 network service entities and ONU's network service interfaces (not shown) thereby establishing other broadband service links to be connected to a respective ONU 101. ONTs 102 also respond to an OLT's 100 control and additionally terminate broadband service links between the OLT's 100 network service entities and a user or subscriber network interface (not shown), which is connected to the ONT 102.

An ONT is a single integrated electronics unit that terminates the PON and presents a Service Provider's network service interfaces to the user or subscriber. An ONU is an electronics unit that terminates the PON and may present one or more converged interfaces, such as digital subscriber line (DSL), multimedia over coax alliance (MoCA), ITU G.hn, IEEE 802.11 WiFi or Ethernet, toward the user or subscriber. An ONU typically requires a separate subscriber unit to provide native user services such as telephony, Ethernet data, or video. In practice, the difference between an ONT and ONU is frequently ignored, and either term is used generically to refer to both classes of equipment.

A PON optical fiber link can be augmented to include a converter 150 at an intermediate node to receive an optical signal that is then transmitted as a radio frequency signal and to receive a radio frequency signal that is then transmitted as an optical signal over the optical fiber link. Converter 150 uses an optical communication protocol (e.g., a PON communication protocol), and no conversion of the received signals (other than optical-to-radio and radio-to-optical) is required. Accordingly, a PON embodiment in accordance with the invention is able to use its optical communication protocol for both optical links and non-optical links that is comprised of radio frequency links. A PON embodiment in accordance with the invention can use an RF link to extend an ODN without necessarily requiring the expense or complexity of stages to perform such functions as frame synchronization, decoding or re-coding of signals in accordance with an RF protocol. Instead, electrical signals associated with a received or transmitted optical signal and electrical signals associated with received or transmitted radio frequency signals can carry the same information. For example, payload data can remain coded according to a coding technique that is optimized for optical links. Overhead data associated with an optical communication protocol (e.g., data link layer framing overhead) can remain the same.

The electrical signal of the associated radio frequency signal and optical signal can also represent a same baseband signal with a same sequence of modulation symbols without requiring reformatting. Formatting, as used herein, refers to a process of preparing a baseband signal from an input data stream for transmission over the PON. Formatting includes line coding, framing, filtering, etc. Various overhead bits (overhead data) may be added to the input data stream (payload data) in accordance with the PON protocol formatting process. Formatting also includes preparation of a sequence of modulation symbols yielding a baseband signal to represent the information in the PON signal transmissions.

The optical or radio frequency signal line coding formats in exemplary embodiments of the invention may include, but not limited thereto, non-return-to-zero (NRZ), return-to-zero (RZ), amplitude-shift keying (ASK), frequency-shift keying (FSK), phase-shift keying (PSK), pulse amplitude modulation (PAM), quadrature amplitude modulation (QAM), and orthogonal frequency division multiplexing access (OFDMA). Both binary and m-ary signaling techniques are envisioned. The choice of modulation depends on design choices involving available bandwidth, line rates, type and architecture of the laser diode and antenna as well as regional climate conditions (e.g. regional rainfall rate).

Modulation, as used herein, refers to the process of mixing a formatted baseband signal with a carrier, either optical or radio frequency. In some embodiments, a baseband signal or modulated signal and its modulation symbols may be amplified, reshaped, retimed, regenerated, and/or filtered during conversion from an optical signal to a radio signal or from a radio signal to an optical signal.

The frequency of the radio frequency carrier in exemplary embodiments of the invention may include, but not limited hereto, microwave frequencies including the ultra high frequency (UHF) band of 300 MHz-3 GHz and extremely high frequency (EHF) band of 30 GHz-300 GHz. It will be appreciated that frequencies in the millimeter wave bands of 57-64 GHz and 71-95 GHz are advantageous due to free or relatively inexpensive licensing. Satellite communications or satellite relay may also be possible between converters in some embodiments of the invention.

Figure 2:
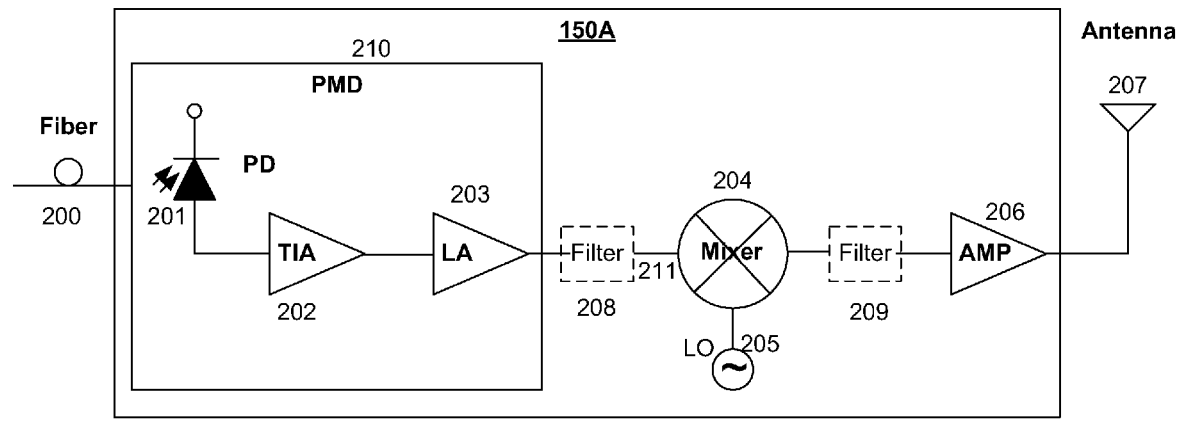
FIG. 2 is a block diagram of an optical receiver and radio frequency transmitter converter according to an embodiment of the invention.

FIG. 2 shows an embodiment in accordance with the invention of a converter 150A that converts optical signal to radio frequency signal. An input optical signal is received over an optical fiber 200. An optical receiver 210 includes a photo detector (PD) 201 that converts the light transmitted over the fiber 200 into an electrical current (e.g., PIN or avalanche photodiode). A transimpedance amplifier (TIA) 202 converts changes in input current to changes in output voltage. The TIA 202 takes the current input from the PD 201 and converts the current to a voltage. The voltage is input into a limiting or linear amplifier (LA) 203. The LA 203 provides voltage gain on, what is typically, the relatively weak signal generated by the PD 201 and TIA 202. The voltage is then input into a Mixer 204 that takes as input a Local Oscillator (LO) signal 205 and a reference signal 211. The mixer 204 modulates the reference 211 input with the LO signal 205 and generates an output signal whose frequency is the sum of the frequencies of the two input signals. The LO frequency 205 is a carrier signal meant to raise the center frequency of the reference signal 211 to a frequency suitable for radio transmission. The effect is that the reference signal 211 is up-shifted about the frequency of the LO signal 205 input. The output of the mixer 204 can then be input to an amplifier (Amp) 206. Amp 206 provides sufficient power for radio frequency transmission with the Antenna 207. Filters 208 and 209 may optionally be included to improve the performance of mixer 204. The mixer 204 may optionally include intermediate frequency stages. Alternatively, the optical receiver 210 can include other types of receivers that generate an electrical signal from an optical signal. Additionally, automatic gain control (AGC) which normalizes an electrical signal by adjusting the gain for a range of input levels may be included in some embodiments of converter 150A (e.g., included with TIA 202, LA 203, filters 208 or 209 or amp 206). One advantage of AGC in converter 150A is to improve communications from burst-mode transmissions (e.g., transmissions received from ONUs or ONTs with different received optical power levels).

Figure 3:
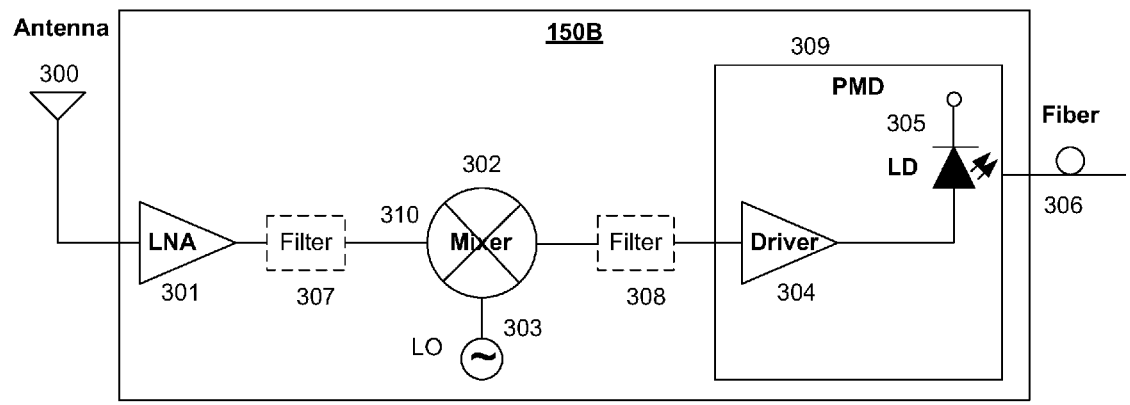
FIG. 3 is a block diagram of a radio frequency receiver and an optical transmitter converter according to an embodiment of the invention.

FIG. 3 shows an alternative embodiment in accordance with the invention of a converter 150B that converts a received radio frequency signal to an optical signal. An input radio frequency signal is received by antenna 300. A low noise amplifier (LNA) 301 provides amplification to the signal produced by the antenna 300 without adding significant noise. A mixer 302 mixes a local oscillator LO signal 303 and reference signal 310 and generates an output signal whose frequency is the difference of the frequencies of the two input signals. The mixer 302 down-converts or demodulates the input from the LNA 301 producing a representation of the received radio frequency signal without the carrier. The output of the mixer 302 is provided as an input to a laser driver (Driver) 304 of an optical transmitter 309. The laser driver 304 provides modulated current based on its input to a laser diode (LD) 305 (e.g., distributed feedback (DFB) laser). The LD 305 creates light transmission based on input from the laser driver 304. For embodiments incorporating burst mode optical transmissions, the driver 304 may or may not provide current to the LD 305 when no radio transmissions are received (e.g., automatic power control circuitry (APC)) and LD 305 is capable of turning on or off in a short period of time. The light transmission is then provided to a fiber 306 that facilitates transmission of the communication received from the antenna 300. Filters 307 and 308 may optionally be included to improve performance of the mixer 302. The mixer 302 may optionally include intermediate frequency stages. Alternatively, the optical transmitter 309 can include other types of transmitters that generate an optical signal from an electrical signal. Additionally, an AGC may be included in some embodiments of converter 150B (e.g., included with LNA 301 or filters 307 or 308). One advantage of AGC in converter 150B is to improve radio reception (e.g., compensating for propagation attenuations).

Figure 4A:
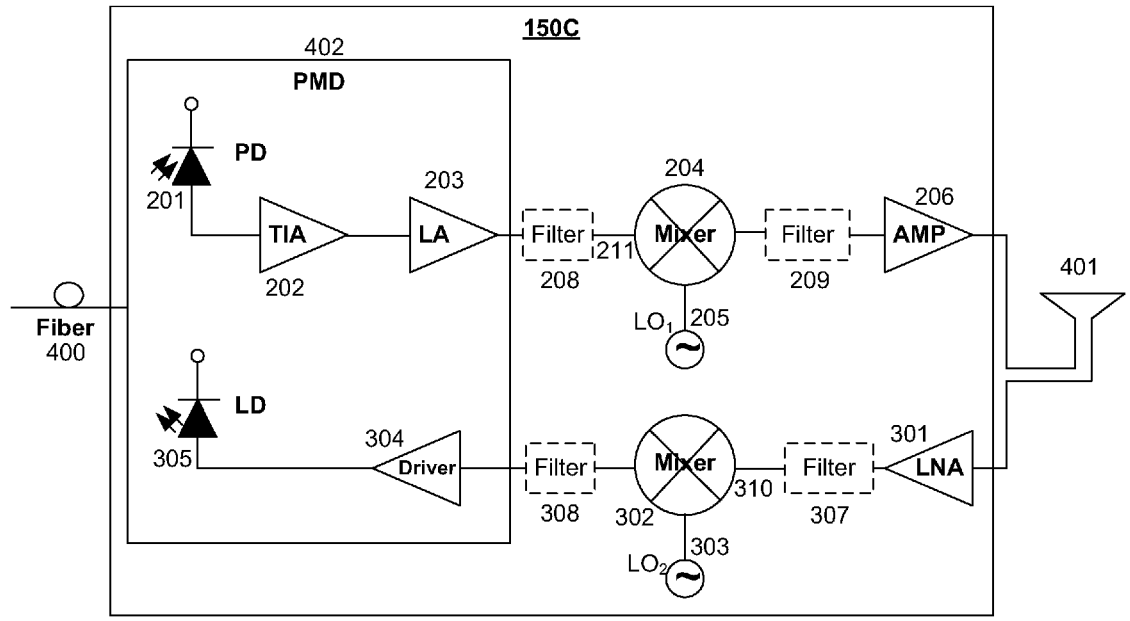
FIG. 4A is a block diagram of a bi-directional radio optical transceiver converter according to an embodiment of the invention.

Both conversion processes of the converter 150A and of the converter 150B can be combined to enable bi-directional communications. An exemplary embodiment in accordance with the invention of a bi-directional converter 150C is shown in FIG. 4A. The mixers 204,302 have local oscillators $LO_1$ 205 and $LO_2$ 303 that may or may not have the same frequency. When appropriate different frequencies are used, bidirectional communication can be made without other considerations. If a same frequency is used in each LO 205, 303, then other techniques include different polarizations for transmitted RF fields or time division multiplexing may be used. The fiber link 400 may include a bi-directional fiber and/or multiple unidirectional fibers. The RF transceiver 401 may include one or more antennas. The physical media dependent (PMD) layer 402 consists of a plurality of optical transmitters, receivers or transceivers which can use any of a variety of optical/electrical conversion techniques and may use a variety of wavelengths (e.g., 1310 nm, 1490 nm, 1550 nm, 1270 nm, 1577 nm).

In some PON systems the upstream communications from an ONU or ONT are burst mode communications and the downstream communications from an OLT are continuous-mode. Some PON systems (e.g., GPON or ITU G.984) have an aspect of their protocols to address the relative differences in optical signal power received by the OLT from ONUs or ONTs due to different distances of the ONUs or ONTs from the OLT or due to differences in manufacture or operating life experience of the optical transmitters of the ONUs or ONTs. This aspect of the protocols seek to achieve relatively equal received optical signal power levels at the OLT by managing the transmit power levels of the ONUs and ONTs through the protocol of the network. By achieving relatively equal power levels the OLT is able to more quickly detect and sync to the burst mode communication which enables burst mode communication of different ONUs and ONTs to be timed closer together and thus improve efficiency of communications as less time is wasted for the OLT receiver to adjust to the communications from a different client ONU or ONT.

It will be appreciated that in some embodiments of the invention, a converter (e.g., FIG. 4A, 150C) may have its optical transmit power level adjusted during installation of the converter. Optical power level adjustment can be accomplished with predetermined transmit power level settings that can be manually adjusted (e.g., DIP switch) and knowledge of the optical loss between the converter and the OLT or an ONU or ONT. Such knowledge of the optical loss may be derived from the length of the optical fiber between the converter and the OLT, ONU or ONT as well as taking into account optical loss from optical splitters and splices along the optical fiber link. The optical loss may also be measured with specialized equipment (e.g., using an optical time domain reflectometry (OTDR) meter or directly measuring optical loss from the far or distal end of the fiber given an optical signal transmission of known optical power).

Additionally it will be appreciated that in some embodiments of the invention, a converter (e.g. FIG. 4A, 150C) may have its radio frequency transmit power level adjusted or signal shaped by filters during installation of the converter. The adjustments can be accomplished with predetermined transmit power level settings and filter settings that can be manually adjusted (e.g., DIP switch) and knowledge of the radio link budget. Radio link budget is an accounting of all the power gains and losses from the transmitter, through the medium (i.e., free space) to the receiver.

Alternative converter embodiments in accordance with the invention may incorporate a media access controller (MAC) (e.g., IEEE 802.3ah) device or transmission convergence layer (TC-Layer) (e.g., ITU G.984.3, IEEE 802.3ah) device capable of registering and being addressed by an OLT and thereby participate in network protocols to regulate optical transmit power levels or RF transmit power levels and RF signal shaping. In some embodiments the optical and RF transmit power levels and RF signal shaping may still be set manually, in additional to being regulated through network protocol communications orchestrated by the OLT.

Figure 4B:
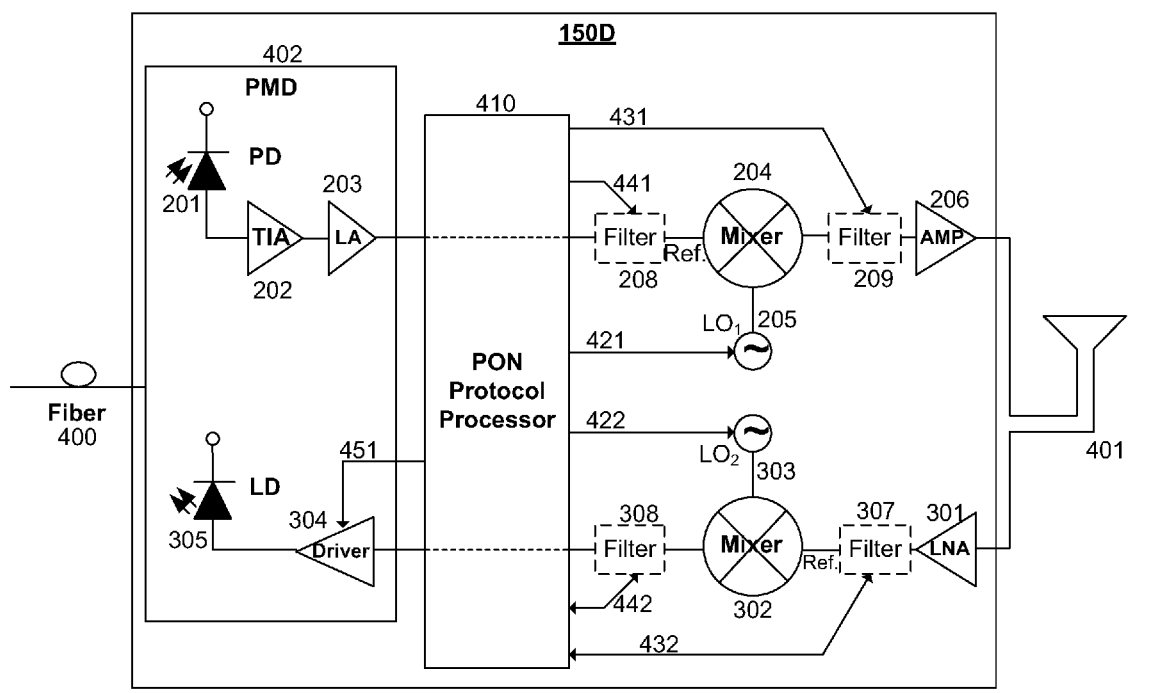
FIG. 4B is a block diagram of a bi-directional converter featuring a PON protocol processor according to an embodiment of the invention.

In an alternative embodiment of a converter in accordance with the invention, bi-directional converter 150D is shown in FIG. 4B which includes a PON protocol processor 410 which is capable of implementing MAC or TC-Layer functionality. This functionality allows the converter 150D to be network addressable by the OLT (e.g., the converter is assigned an ONU-ID or has a MAC address) and to interact with the OLT through the network protocols used by the PON. An OLT, via the network protocols, may adjust conversion operation and function parameters of converter 150D such as internal modulation parameters for both optical signals and RF signals transmissions. For example, an OLT may select LO frequencies 421, 422 and/or adjust transmit RF filter parameters 431, 441 and/or adjust receive RF filter parameters 432, 442 and/or adjust optical signal transmit parameters 451 (e.g., bias or modulation current limits). The receive RF filters 308, 307 may include measurements of RF performance parameters (e.g., receive signal strength indication (RSSI)), via 432,442 that may be conveyed by the PON protocol processor 410 through network communications to inform an OLT of the current state of RF signal strengths and to aid overall RF link performance. Additionally, measurement of received optical power (e.g., optical RSSI) may be conveyed by the PON protocol processor 410 through network communications to inform the OLT which can then be used to determine optical loss between fiber links and adjust optical transmit power levels of converters.

It will be appreciated that some embodiments of converters with PON protocol processors, the converters may undergo a radio channel discovery process wherein the converters search a range of frequencies in order to establish communications with an OLT. Additionally it will be appreciated that an OLT may communicate to a converter to initiate a new discovery process at a predetermined frequency for the converter to establish communication with a different OLT. This process has advantages for network survivability as well as load balancing of clients on a PON.

Figure 4C:
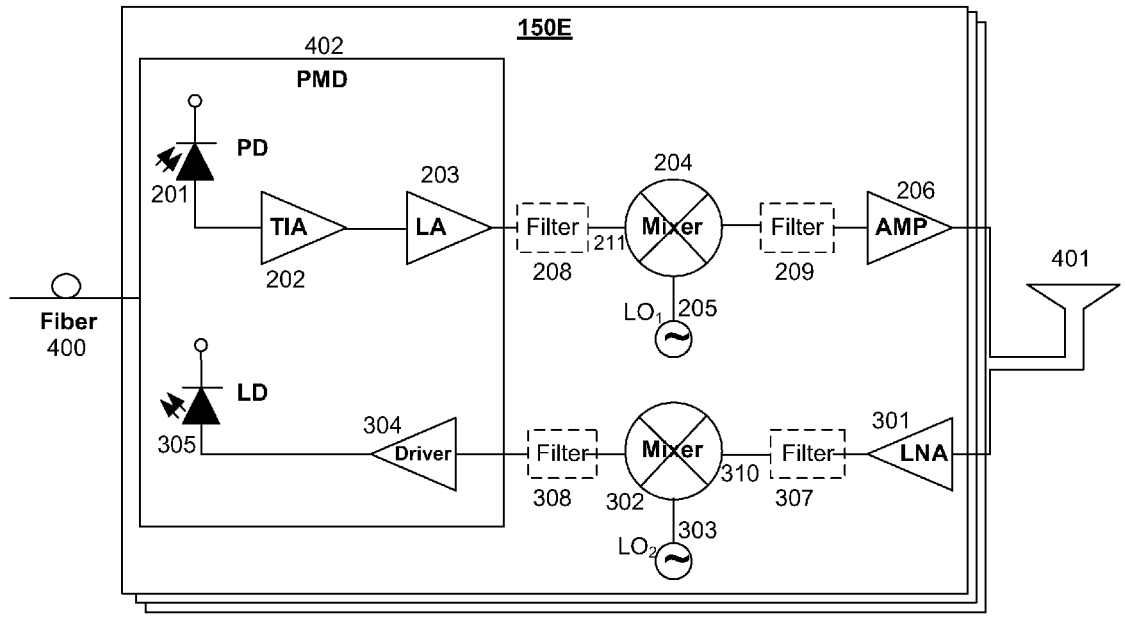
FIG. 4C is a block diagram of a bi-directional converter according to an embodiment of the invention.

In another alternative embodiment of a converter in accordance with the invention, bi-direction converter 150E is shown in FIG. 4C, wherein cascading boxes below a part designates a plurality of such parts. Converter 150E is capable of converting a plurality of optical signals of different wavelengths or radio signals of different frequencies. Wherein each optical signal or radio signal uses unique wavelength or frequency and the corresponding conversion generates a radio signal or optical signal having a unique frequency or wavelength. Converter 150E is capable of being utilized by or operating in a Wavelength Division Multiplexing PON, or WDM-PON. A WDM-PON is a type of passive optical networking wherein multiple wavelengths of the WDM-PON are dedicated for each and every ONU or ONT. Alternatively the multiple wavelengths can be used to separate ONUs or ONTs into several virtual PONs co-existing on the same physical infrastructure. In yet another alternative, the multiple wavelengths of the WDM-PON can be used collectively by all ONUs or ONTs through statistical multiplexing to provide efficient wavelength utilization and lower delays experienced by the ONUs and ONTs.

Figure 4D:
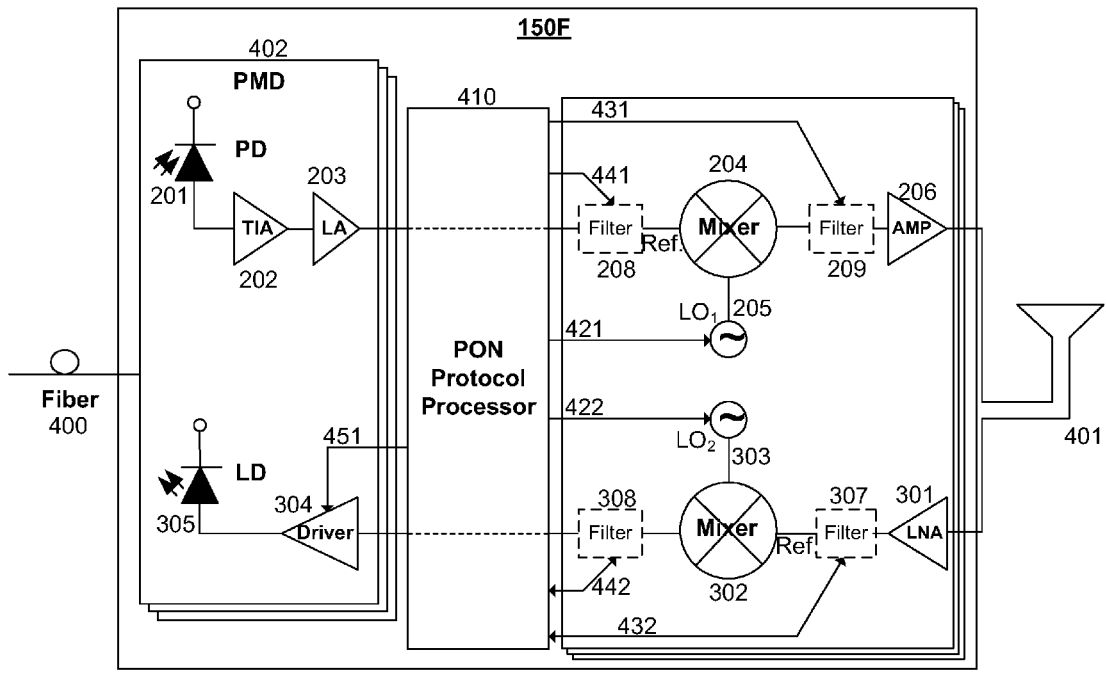
FIG. 4D is a block diagram of a bi-directional converter featuring a PON protocol processor for a according to an embodiment of the invention.

In another alternative embodiment of a converter in accordance with the invention, bi-directional converter 150F is shown in FIG. 4D. Converter 150F, similarly to converter 150E incorporates the capabilities of converting a plurality of optical signals and radio signals having unique wavelengths and frequencies and similarly to converter 150D incorporates the network protocol awareness and OLT regulation of the converters internal optical and radio conversion parameters as previously described.

Figure 4E:
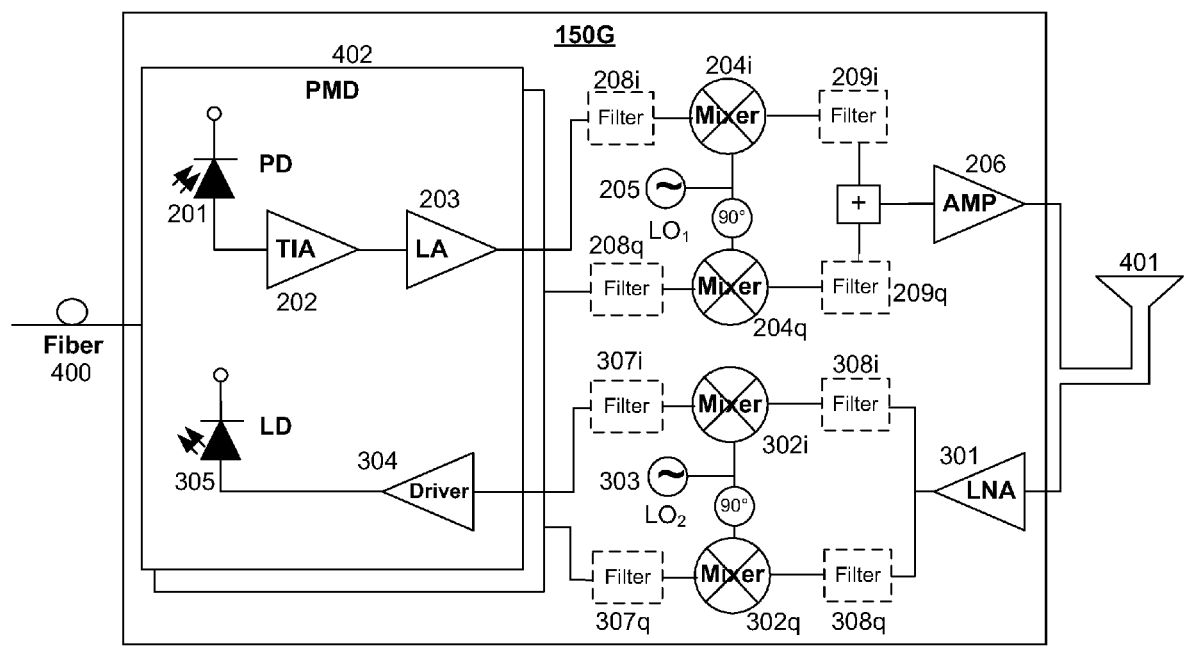
FIG. 4E is a block diagram of a bi-directional converter featuring quadrature signal modulation according to an embodiment of the invention.

Other alternative embodiments of a converter in accordance with the invention are envisioned. Envisioned are converters for a WDM-PON which combines a plurality of optical signals, each on a unique or dedicated wavelength, onto a single radio signal and/or separates a radio signal into a plurality of optical signals each on a unique wavelength. For example, two optical signals received and combined into a single radio signal by a converter 150G is shown in FIG. 4E. The two optical signals are received and converted to two electrical signals by two optical PMDs 402. Each PMD 402 adapted to receive and transmit on different wavelengths as well as on different wavelengths from each other or on the same wavelengths in a given direction on separate fibers. The converter 150G utilizes a quadrature based modulation line coding scheme (e.g., QPSK, QAM), in particular for this embodiment differential QPSK (DQPSK), for radio signals. The received optical signals are modulated on separate channels as represented by mixers 204i, 204q and optional filters 208i, 208q and 209i, 209q and then combined and transmitted by RF transceiver 401. Received radio signals are demodulated along separate channels as well, as represented by mixers 302i, 302q and optional filters 307i, 307q and 308i, 308q to recover and then generate and transmit two optical signals each on different wavelengths.

Figure 4F:
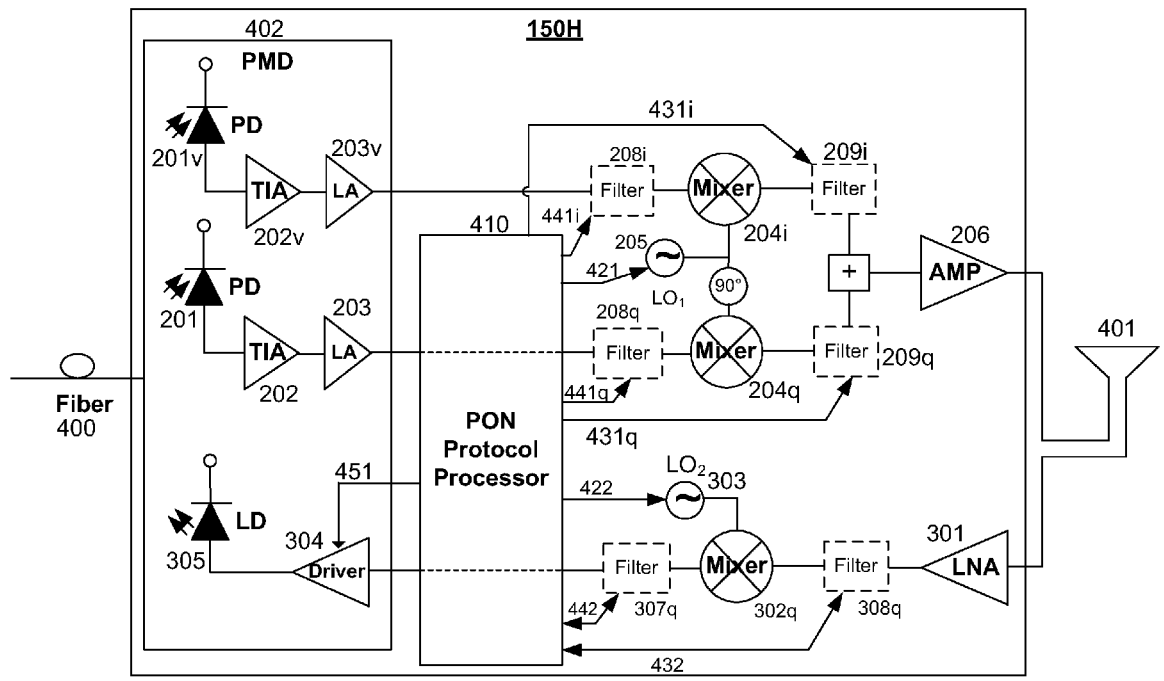
FIG. 4F is a block diagram of a bi-directional converter featuring quadrature signal modulation and a PON protocol processor according to an embodiment of the invention.
Figure 4G:
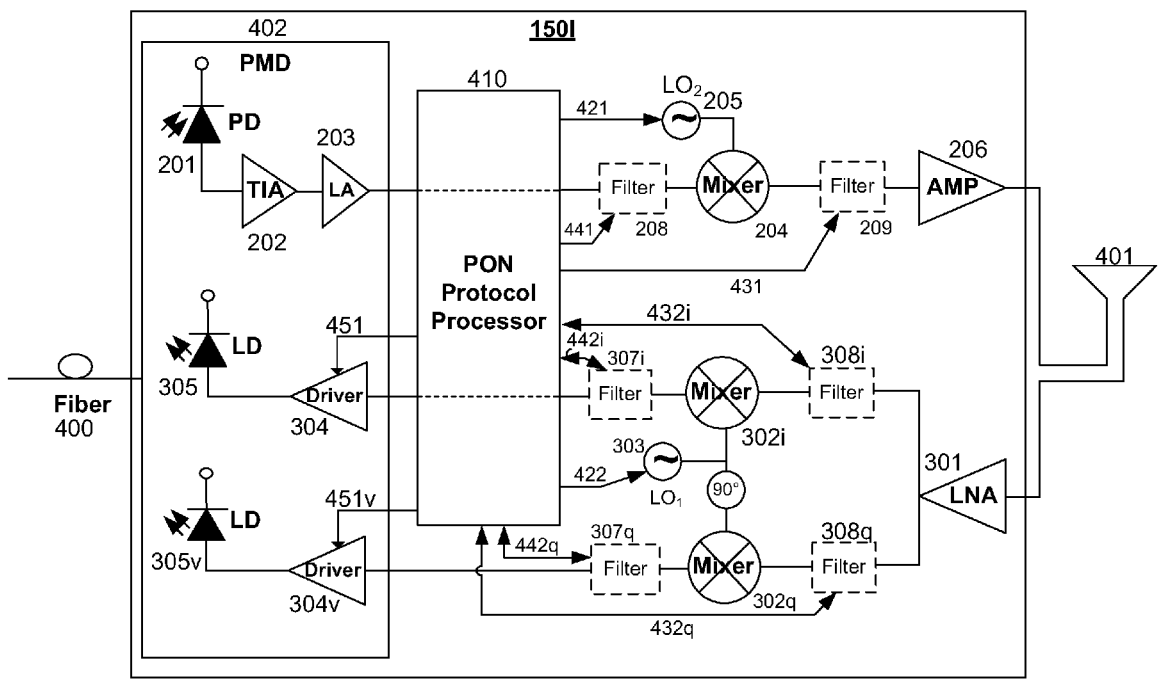
FIG. 4G is a block diagram of a bi-directional converter featuring quadrature signal modulation and a PON protocol processor according to an embodiment of the invention.

Another embodiment of a converter in accordance with the invention is shown in FIG. 4F. Converter 150H incorporates the quadrature modulation of converter 150G and a PON protocol processor of converters 150D and 150F. Similarly to converters 150D, 150F the PON protocol processor is capable of interacting with the OLT through the PON network protocols as well as, in some embodiments, adjusting optical signal transmit parameters and radio transmit and receive parameters. It will be appreciated that converter 150H illustrates a converter capable of current triple play services (e.g., voice, data, video) wherein one of the two optical wavelengths (e.g., 1550 nm) received is a video signal or channel which is not processed by the PON protocol processor (e.g., 201v, 202v, 203v). FIG. 4G illustrates an embodiment of a converter 150I that is complementary to converter 150H in that it can receive a quadrature modulated radio signal and convert the received radio signal into two optical signals and transmit them (e.g., 304v, 305v), possibly using the same optical wavelengths as received by converter 150H (e.g., 1490 nm and 1550 nm).

Quadrature based modulation schemes have an "I" channel and a "Q" channel that are modulated orthogonal to each other and because of this orthogonal property of the channel, it is possible to detect and demodulate the signals independently. Additionally, the bit transitions in the I and Q channels may occur simultaneously.

Therefore it is possible to assign optical wavelengths to the I and Q channel in a quadrature based line coded radio signal and thereby transmit and/or receive two optical signals. An advantage of such a converter is increase radio spectral efficiency in a WDM-PON utilizing radio links in accordance with the invention.

It will be appreciated that alternative embodiments of converters incorporating carrier recovery circuitry (e.g., PLL) to demodulate received radio signals (i.e., coherent detection) are also possible and envisioned but not shown. It will also be appreciated that the embodiments of converters shown are exemplary and mean illustrate aspects of the invention and combination of features from one converter can be combined or subtracted from features of another converter. For example, converters similar to converters 150H or 150I which lack the PON protocol processor are not only possible but envisioned.

Figure 5A:
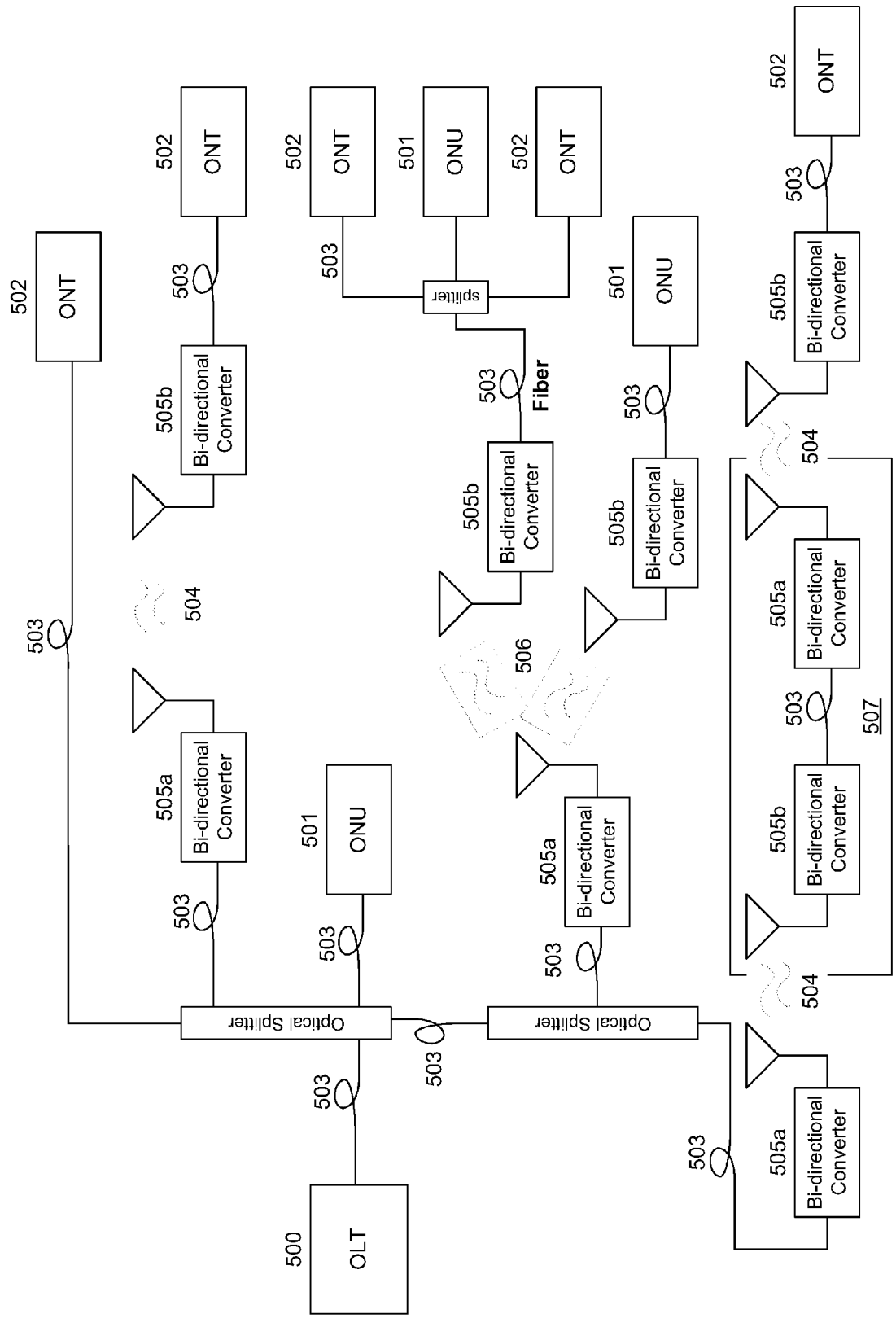
FIG. 5A is a block diagram of a passive optical network with converters according to an embodiment of the invention.

FIG. 5A is a block diagram of an embodiment of a passive optical network system with augmented radio frequency links in accordance with the invention. The PON system includes an OLT 500 with ONUs 501 and ONTs 502 connected across fibers 503 and wireless links 504 provided by bi-directional converters 505a, 505b. The bi-directional converters 505a, 505b may use different frequencies to transmit data between the OLT 500, ONU 501 and ONT 502 in which case the LO input of the corresponding mixers will be different to match the corresponding transmit and receive frequencies. The ONUs 501 and ONTs 502 may be connected to the OLT 500 by a fiber link 503. The ONUs 501 and ONTs 502 may be connected to the OLT 500 by a combination of fiber and a wireless link 504 using bi-directional converters 505a, 505b. Multiple ONUs 501 and ONTs 502 may be connected to an OLT 500 by individual point-to-point wireless links (e.g., links 504) or by point-to-multipoint wireless links (e.g., link 506 where a bi-directional converter 505a supports a plurality of bi-directional converters 505b). Additionally, the ONUs 501 and ONTs 502 may be connected to the OLT 500 by multiple wireless links 504. For example, in such a connection, a bi-directional converter 505b is connected to another bi-directional converter 505a by fiber link 503 as shown in figure element 507. Alternative point-to-multipoint fiber optic network configurations with augmented wireless links may be used.

Figure 5B:
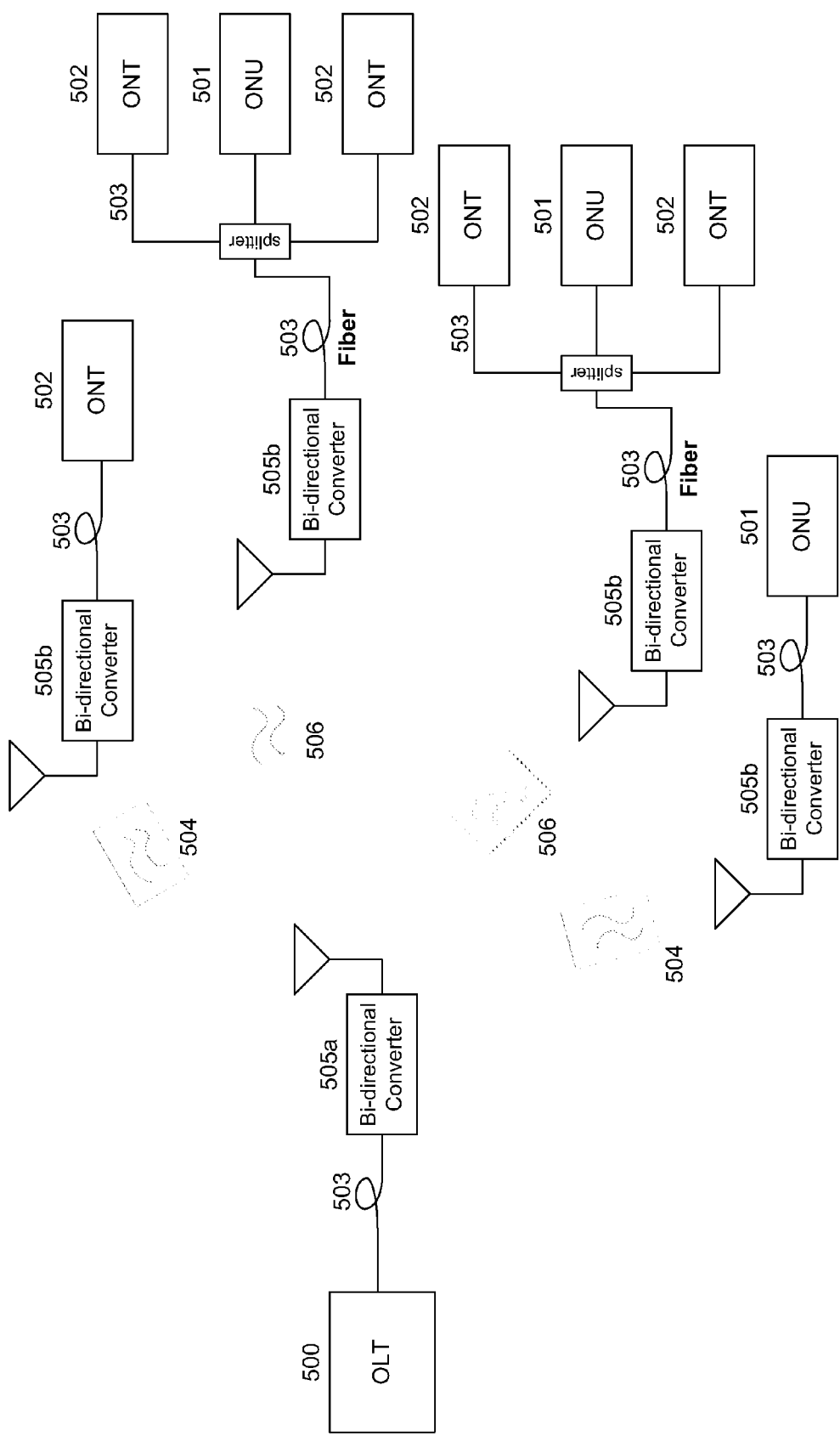
FIG. 5B is a block diagram of a passive optical network with converters according to an embodiment of the invention.
Figure 5C:
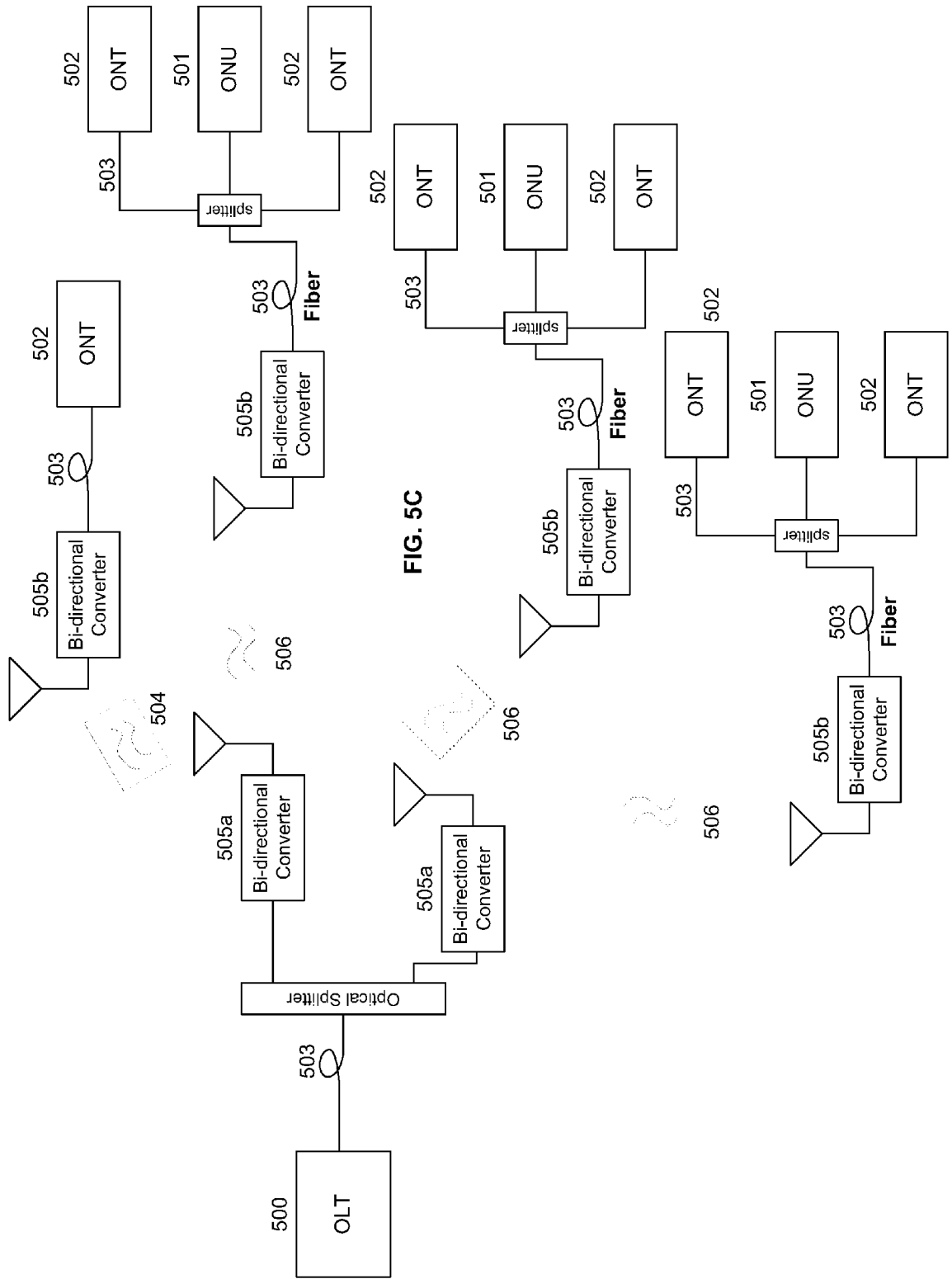
FIG. 5C is a block diagram of a passive optical network with converters according to an embodiment of the invention.

FIG. 5B and FIG. 5C are block diagrams of exemplary embodiments of a PON with augmented radio frequency links in accordance with the invention. These embodiments illustrate several benefits in accordance with the invention. For example, it is possible to have a PON system that has no direct optical connection or no all optical communication link between an OLT 500 and an ONU 501 or ONT 502. Additionally, a converter 505a may be directly connected to an OLT 500 or a passive optical splitter 503 may be used to optically couple a plurality of converters 505a to an OLT. Furthermore for a given optical budget for an OLT and an ONU or ONT, since optical splitters divide optical power among its splits this limits the number of ONUs or ONTs as well as the distance between the OLT and an ONU or ONT. It will be appreciated that converters 505a, 505b generate optical signals and therefore the optical budget of the PON system is increased supporting more client ONUs or ONTs as well as longer optical fiber runs in addition to the free-space distance between converters 505a and 505b. For example, and not limited hereto, current PON protocols support 128 client ONUs or ONTs on a PON, embodiments in accordance with the invention may support up to 4093 client ONUs or ONTs given current addressing limits of VLAN tagging of IEEE 802.1q.

As previously mentioned, a derivative PON protocol specification may be used to implement a PON in accordance with the invention. The derivative protocol specifications may take into account increased communication delays because of the wireless links 504, an increase in the number of ONU/ONT clients supported by the PON, as well as take into account the addition of network protocol capable converters (e.g., FIG. 4B, FIG. 4D, FIG. 4F, FIG. 4G) in a PON as compared to current PON protocol specifications (e.g., ITU G.983, ITU G.984, IEE 802.ah).

Although the invention has been described in terms of exemplary embodiments, it is not limited thereto. The present invention may be embodied in other specific form without departing from its spirit or essential characteristics. The described embodiments are to be considered in all aspects only as illustrative and not restrictive. Rather, the appended claims should be construed broadly, to include other variants and embodiments of the invention, which may be made by those skilled in the art without departing from the scope and range of equivalents of the invention. All changes which come within the meaning and range of equivalency of the claims are to be embraced within their scope.

The invention claimed is:

1. A passive optical network converter of optical signals and radio signals adapted to perform transmission convergence layer or media access controller functions and adapted to be assigned a network address by an optical line terminal and adapted to down convert a received high frequency radio signal to a lower frequency signal and adapted to adjust optical transmit power levels of a burst-mode optical transmitter and adapted to transmit a burst-mode optical signal responsive to the lower frequency signal and adapted to up convert a received optical signal to a higher frequency signal and adapted to transmit a continuous-mode radio signal responsive to the higher frequency signal.

2. The converter of claim 1, including means for manual adjustment of the optical transmit power levels.

3. The converter of claim 1, wherein the converter is adapted to adjust the optical transmit power level or radio transmit power level responsive to communication from the optical line terminal.

4. The converter of claim 1, wherein the converter is adapted to adjust a radio parameter setting responsive to communication from the optical line terminal.

5. The converter of claim 1, wherein the converter reports the optical receive power level, radio receive power level, or a radio parameter setting to the optical line terminal.

6. The converter of claim 1, wherein the converter is adapted to perform quadrature modulation combining two optical signals into a single radio signal or separating a radio signal into two optical signals.

7. A converter of optical signals and radio signals in a passive optical network, the passive optical network having an optical line terminal, the converter comprising:
  an optical port;
  a passive optical network protocol processor having a transmission convergence layer and adapted to be assigned a network address by the optical line terminal, the passive optical protocol processor adapted to receive, process and respond to network communications responsive to network communications initiated from the optical line terminal and addressed to the passive optical network protocol processor;
  radio circuitry adapted to modulate a low frequency signal to a higher frequency signal and adapted to demodulate a high frequency signal to a lower frequency signal; and
  an antenna port,
  whereby the converter is adapted to transmit a radio signal responsive to a received optical signal and is adapted to transmit an optical signal responsive to a received radio signal.

8. The converter of claim 7, wherein the passive optical network protocol processor includes a media access controller (MAC).

9. The converter of claim 7, wherein the optical port includes an optical transceiver.

10. The converter of claim 7, wherein converter is adapted to adjust the optical or radio transmit power level responsive to communication from the optical line terminal.

11. The converter of claim 7, wherein the converter is adapted to adjust a radio filter setting responsive to communication from the optical line terminal.

12. The converter of claim 7, wherein the radio circuitry is adapted to perform quadrature modulation.

13. A passive optical network having an optical line terminal, a plurality of optical network units, a plurality of passive optical splitters and at least one communication link between the optical line terminal and an optical network unit, the passive optical network communication link comprising:
  an optical line terminal coupled to a first optical fiber and adapted to transmit a first optical signal and receive a second optical signal;
  a first converter coupled to the first optical fiber and coupled to a first antenna, the first converter adapted to transmit a first radio signal through the first antenna responsive to the first optical signal received through the first optical fiber and adapted to transmit the second optical signal through the first optical fiber responsive to a second radio signal received over the first antenna;
  a second converter coupled to a second optical fiber and coupled to a second antenna, the second converter adapted to transmit a third optical signal through the second optical fiber responsive to the first radio signal received over the second antenna and adapted to transmit a second radio signal through the second antenna responsive to a forth optical signal received through the second optical fiber;
  a passive optical splitter coupled to the second optical fiber and coupled to a third optical fiber; and
  an optical network unit coupled to the third optical fiber and adapted to receive the third optical signal and adapted to transmit the forth optical signal;
  whereby the communications between the optical line terminal and the optical network unit of a passive optical network includes radio signal communications across a radio link.

14. The passive optical network of claim 13, wherein the optical network unit is an optical network terminal or is an electronics unit that terminates the passive optical network and may present one or more converged interfaces, such as DSL, MoCA, G.hn, WiFi or Ethernet, toward a subscriber.

15. The passive optical network of claim 13, the passive optical network further comprising a second passive optical splitter coupled between the optical line terminal and the first converter.

16. The passive optical network of claim 15, wherein the passive optical splitters employ Brewster's angle principals.

17. The passive optical network of claim 13, the first converter adapted to adjust optical transmit power levels.

18. The passive optical network of claim 13, wherein the first or second converter comprise a passive optical network protocol processor which includes transmission convergence layer or media access controller functions.

19. The passive optical network of claim 13, wherein the first and second converter are adapted to perform quadrature modulation.

* * * * *